Aug. 14, 1934.  C. G. MORTIMER  1,969,898
TAG FORMING, EMBOSSING, AND AFFIXING MACHINE
Filed June 19, 1931   10 Sheets-Sheet 1

INVENTOR
BY *Charles G. Mortimer*
*Knight & Bro.* ATTORNEYS.

Aug. 14, 1934.  C. G. MORTIMER  1,969,898
TAG FORMING, EMBOSSING, AND AFFIXING MACHINE
Filed June 19, 1931  10 Sheets-Sheet 3

INVENTOR,
Charles G. Mortimer
BY
Single Bros.
ATTORNEY.

Aug. 14, 1934.  C. G. MORTIMER  1,969,898
TAG FORMING, EMBOSSING, AND AFFIXING MACHINE
Filed June 19, 1931  10 Sheets-Sheet 4
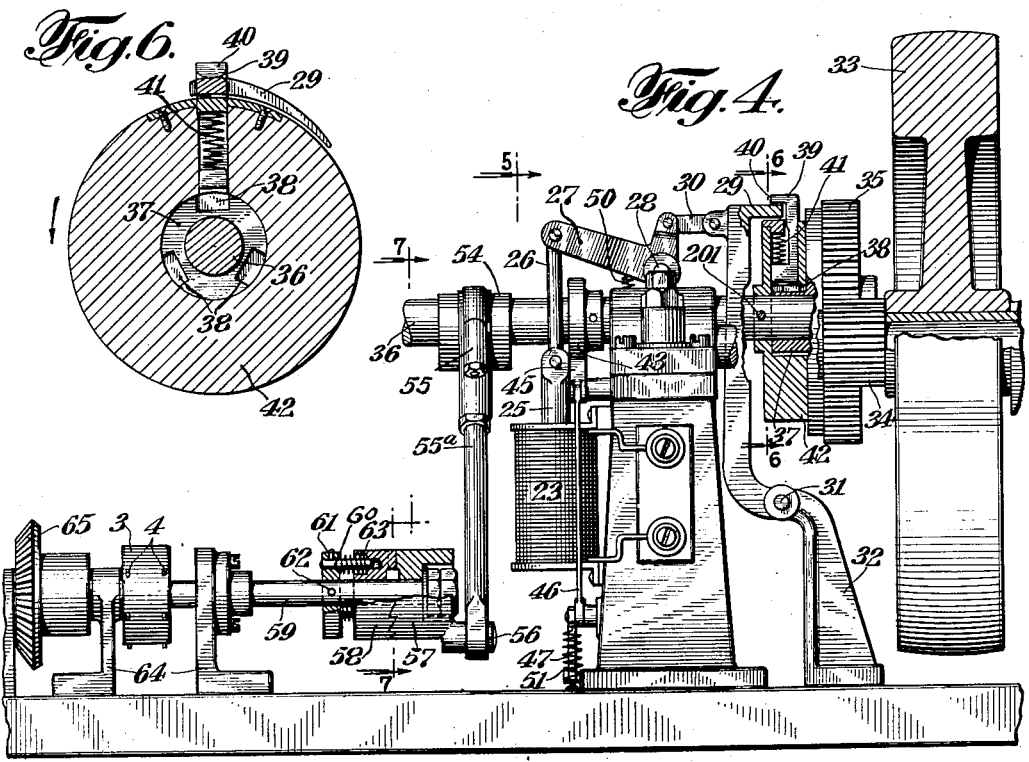
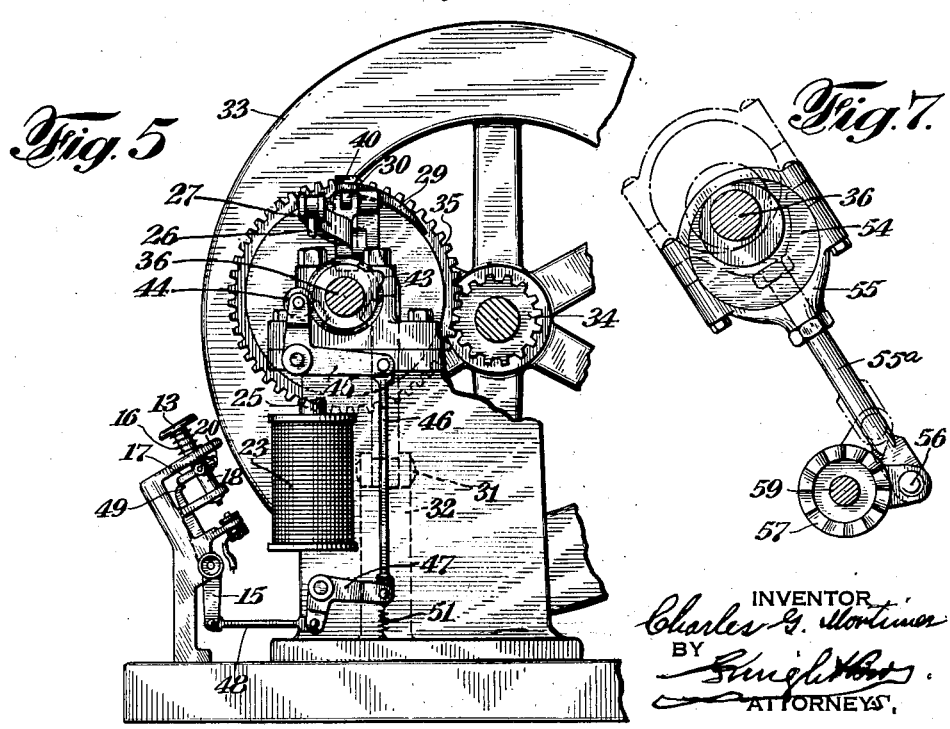

Aug. 14, 1934.     C. G. MORTIMER     1,969,898
TAG FORMING, EMBOSSING, AND AFFIXING MACHINE
Filed June 19, 1931     10 Sheets-Sheet 5
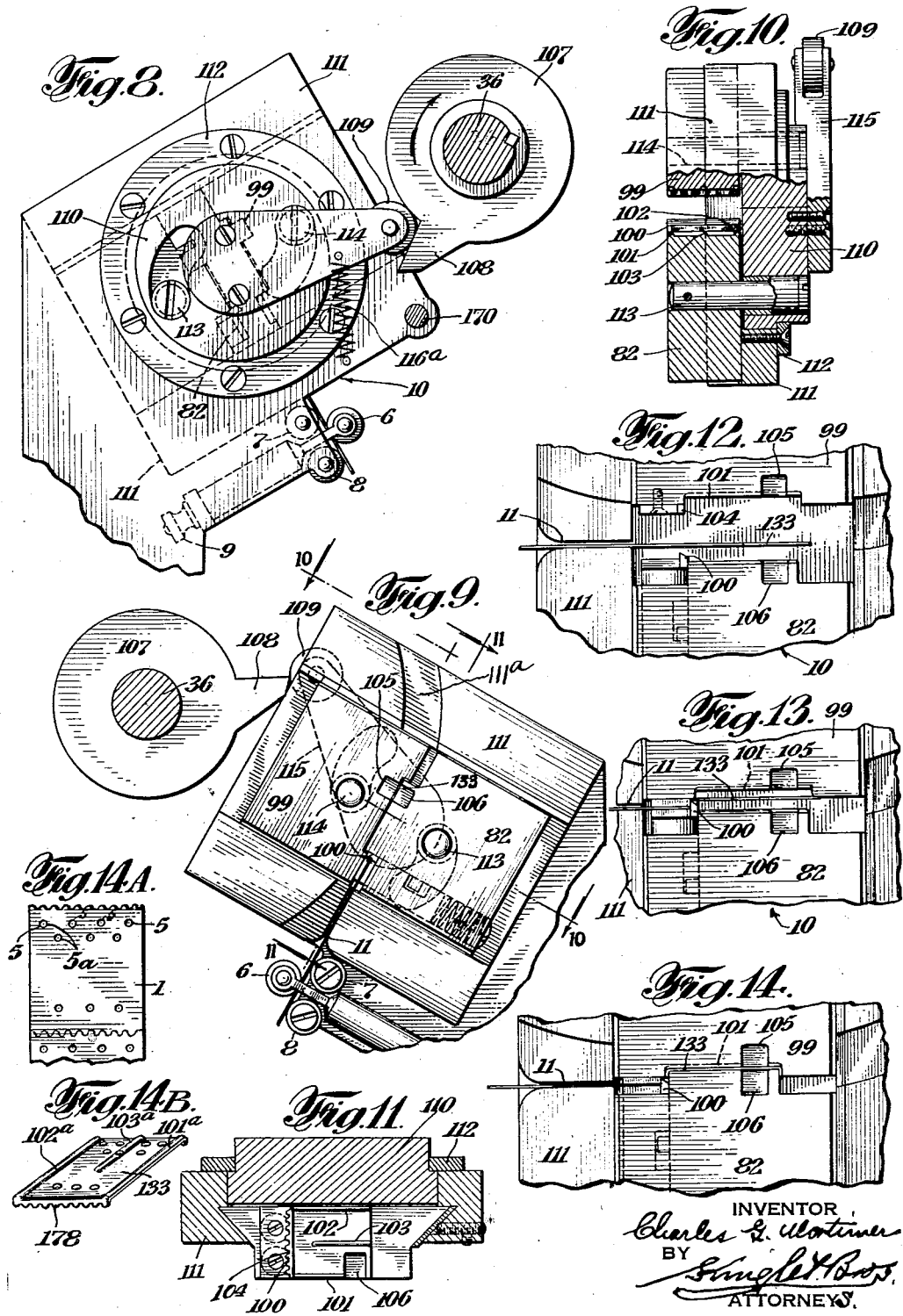

Aug. 14, 1934.   C. G. MORTIMER   1,969,898
TAG FORMING, EMBOSSING, AND AFFIXING MACHINE
Filed June 19, 1931   10 Sheets-Sheet 6
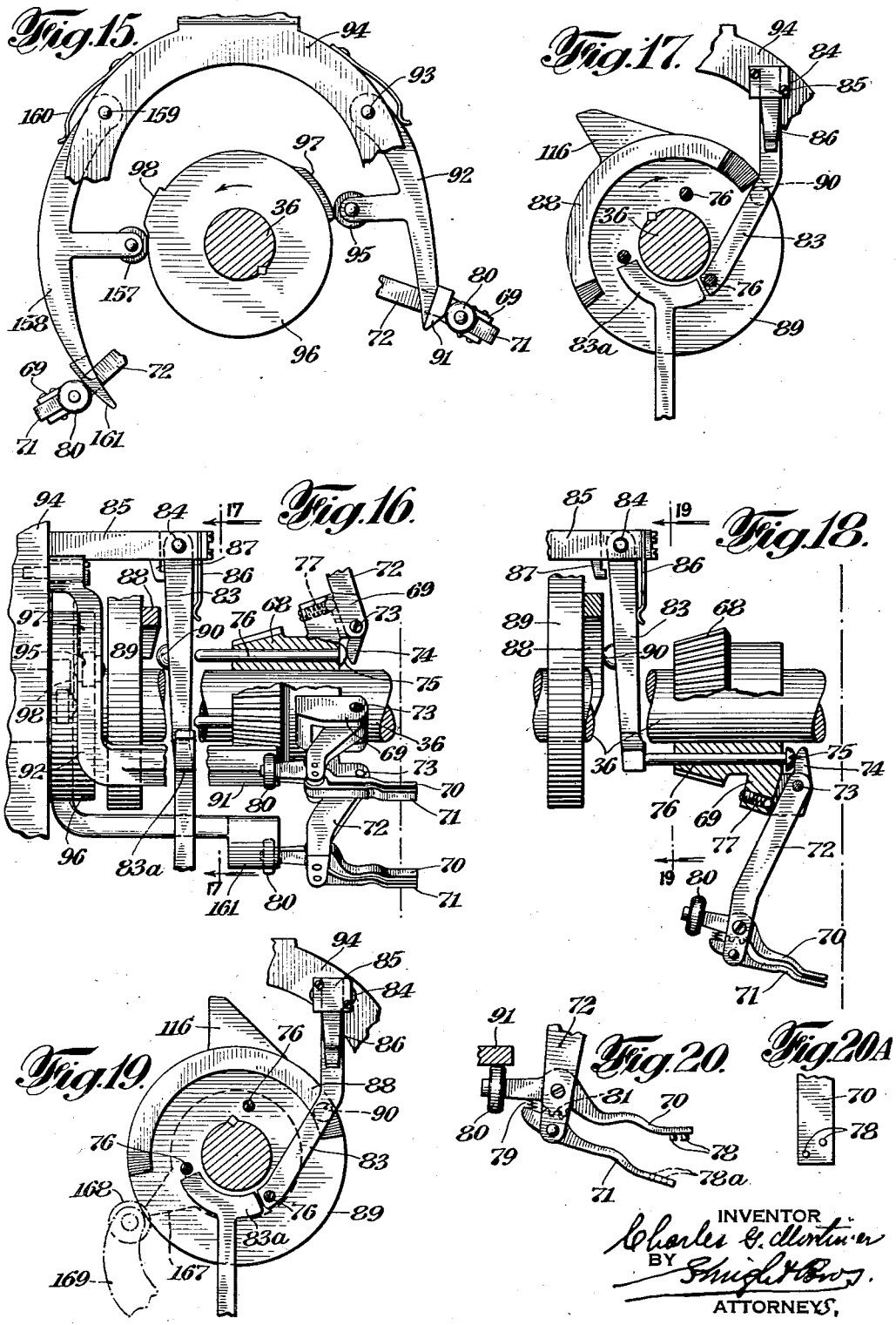

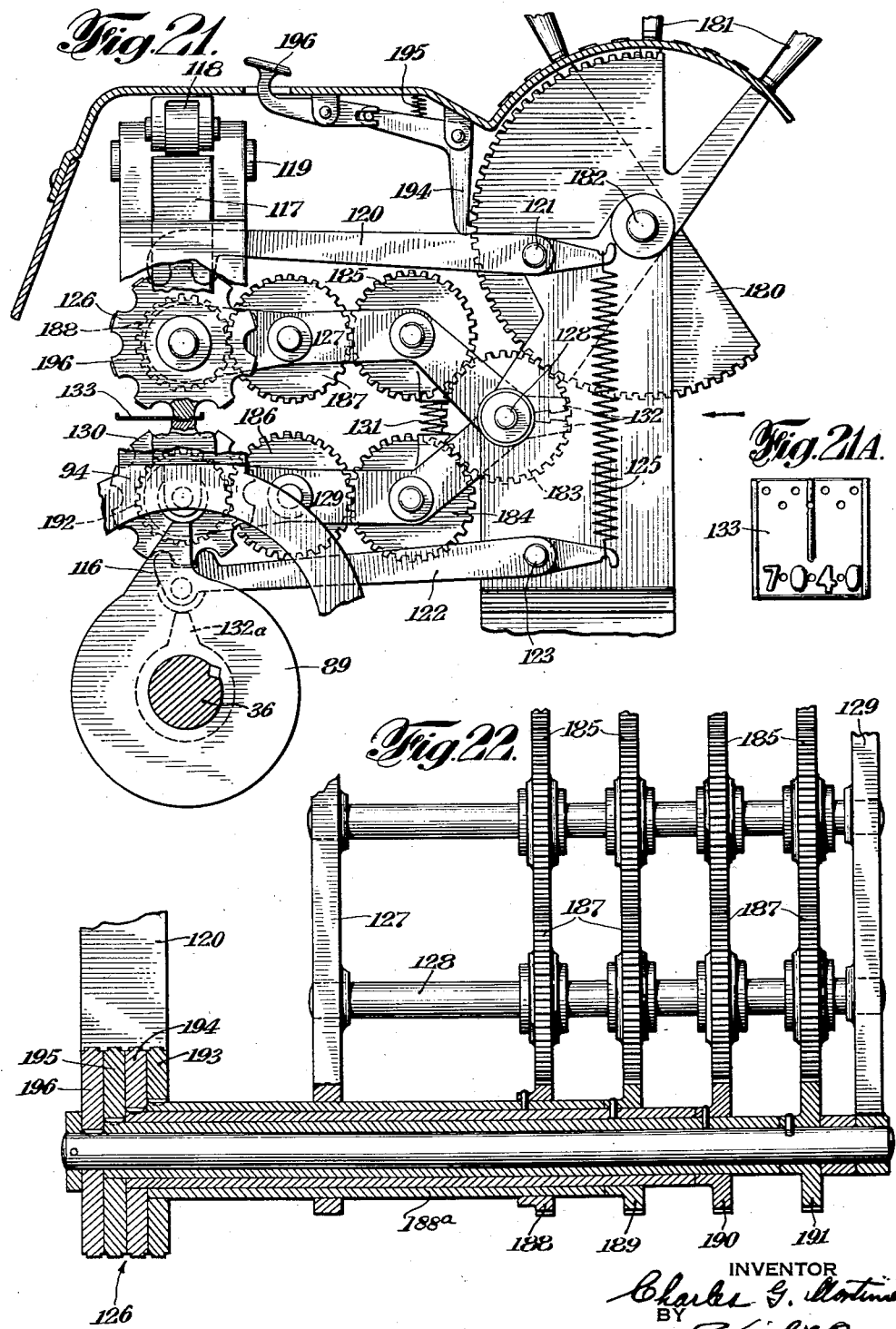

Aug. 14, 1934.   C. G. MORTIMER   1,969,898
TAG FORMING, EMBOSSING, AND AFFIXING MACHINE
Filed June 19, 1931   10 Sheets-Sheet 8
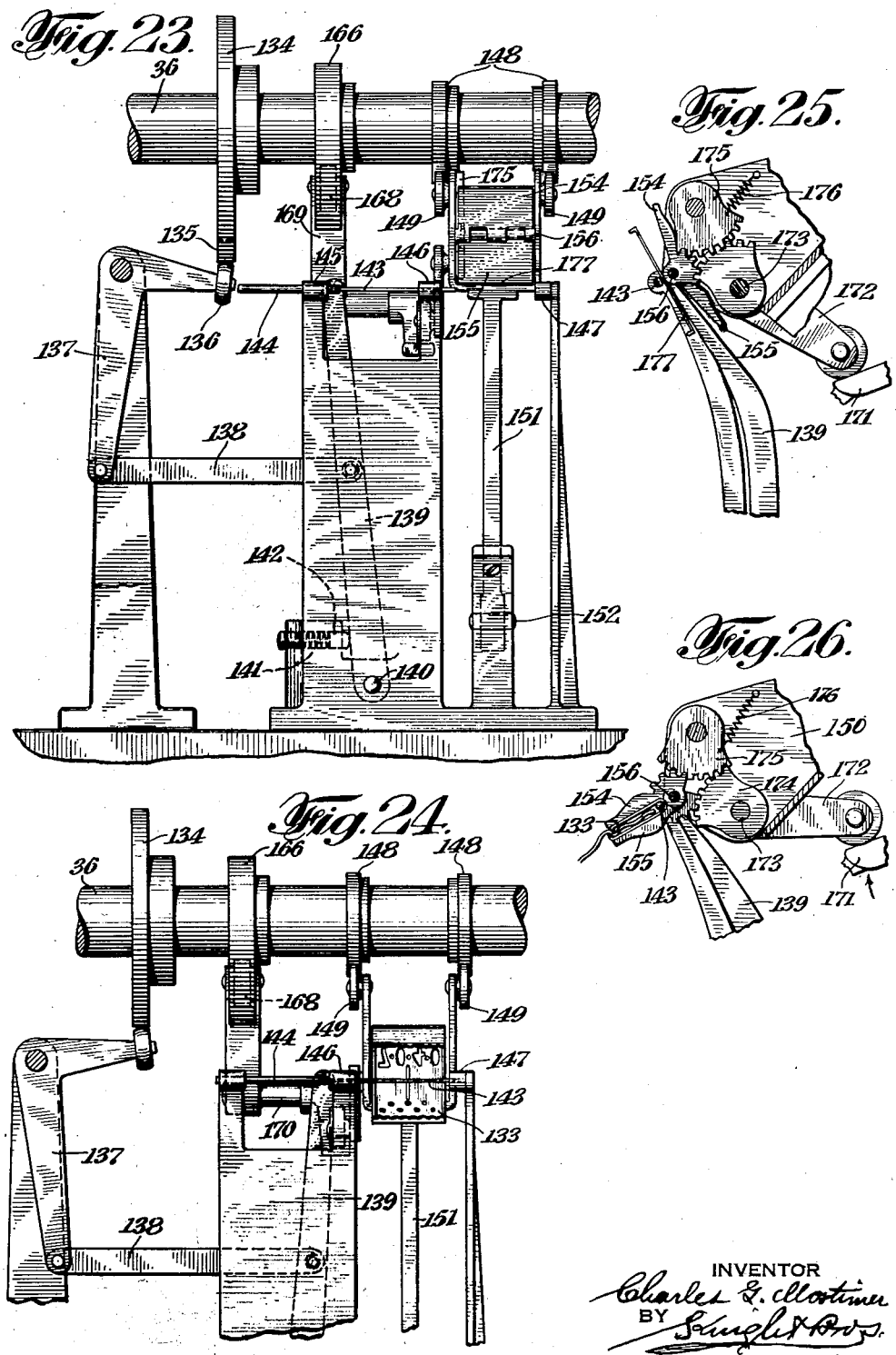

Aug. 14, 1934.    C. G. MORTIMER    1,969,898
TAG FORMING, EMBOSSING, AND AFFIXING MACHINE
Filed June 19, 1931    10 Sheets-Sheet 9
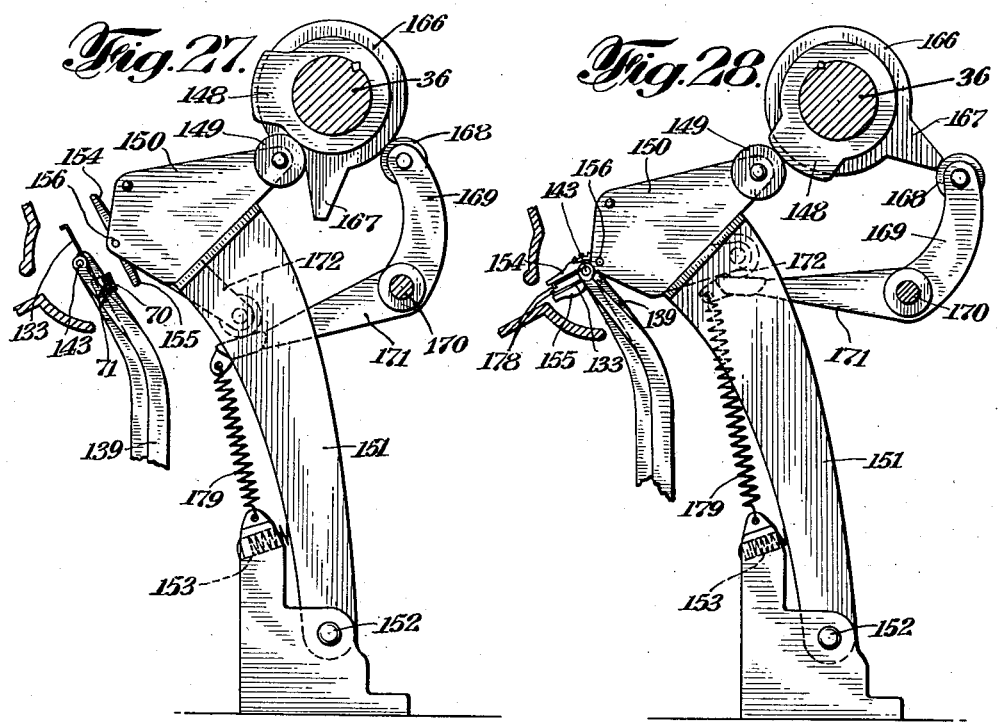
INVENTOR
Charles G. Mortimer
BY
ATTORNEYS Aug. 14, 1934.  C. G. MORTIMER  1,969,898
TAG FORMING, EMBOSSING, AND AFFIXING MACHINE
Filed June 19, 1931  10 Sheets-Sheet 10
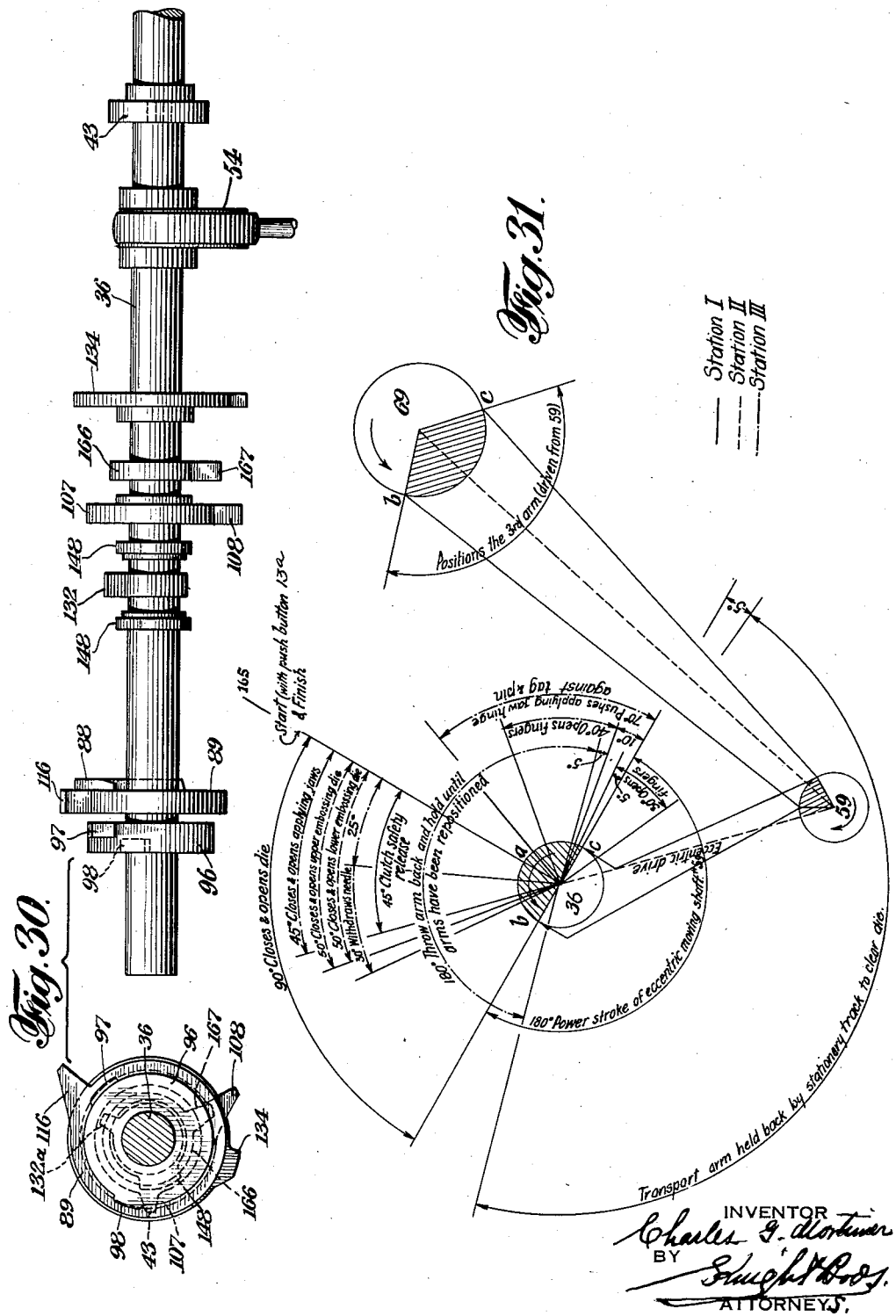

Patented Aug. 14, 1934

1,969,898

UNITED STATES PATENT OFFICE 1,969,898

TAG FORMING, EMBOSSING, AND AFFIXING MACHINE

Charles G. Mortimer, Glen Ridge, N. J., assignor to Joseph H. Lynch, Asbury Park, N. J.

Application June 19, 1931, Serial No. 545,424

39 Claims. (Cl. 93—88)

This invention relates to a system for making and applying identification marks, whereby groups of work pieces receive similar identifications, more particularly to a machine for making and applying identification tags to laundry or other material of soft and sheet-like character.

The invention has for its objects the provision of a system and apparatus adapted for cutting tags from a ribbon-like material, shaping the tags, applying identification marks to the tags, and applying the tags to the work pieces to be identified, whereby all these operations are carried out automatically and by one machine unit.

A further object of the present invention is to provide an apparatus for applying identification marks, whereby groups of like identification marks are made and applied, and whereby the identifying marks are changeable by the operator when required to identify other groups of materials.

A further object of the present invention is to provide an apparatus which carries out substantially three major operations at the same time—cutting and shaping of the tag, applying identification marks to the tag, and applying the tag to the work pieces to be identified—and whereby at each operation of the machine, a finished tag is available and applied instantly, while at the same time, the identification marks are applied to another tag, and material for another tag is automatically fed into the machine and a tag is cut and shaped from it.

An object of the invention is the provision of a novel construction of feeding raw material into the tag making machine, cutting the tags and at the same time giving them an improved shape which is particularly suitable to apply the tags to the material to be identified and secure their staying on the material without tearing or otherwise affecting the material.

An object of this invention is the provision of a construction suitable for making identification tags for laundry or the like and for applying said tags to the materials to be identified, by folding it around the materials, said tags having a plurality of perforations adapted to allow the water to flow also through the folded tag and to come in intimate contact with the materials.

An object of my invention resides in the provision of a construction which applies reinforcements of a novel design to identification tags, which secure maintenance of the shape of the tag even under very rough treatment.

An object of this invention is the provision of reinforcements on the identification tags for the purpose specified, said reinforcements being of novel design and allowing the punching of holes, figures or other identification marks on the tag without impairing its strength.

An object of the invention is the provision of a novel design of fingers for gripping the work piece or the tag, and carrying it from the operation of cutting, and shaping it to the other operations necessary to complete the desired design of the work piece or tag, and to carry it to the point of its destination.

Another object of the invention is the provision of a combination of an electrically operated clutch and cut-off arrangement which ensures that power for operating the machine is only supplied for certain predetermined periods sufficient to complete one cycle of operation, and that the time of the power supply does not depend on the judgment of the operator.

A further object of the present invention resides in the provision of a combination of an eccentric and ratchet clutch to secure partial rotation of one shaft while another shaft revolves continuously.

With the above and other objects in view, the invention relates to certain novel features of combination and coordination of machine parts, an example of which is described in the following specification, and illustrated in the accompanying drawings, in which: a varying scale is adopted as seems required for clearness of illustration in each case, and in which—

Figure 4 is a rear view showing the coupling to connect the main shaft of the machine to the power drive and the feeding mechanism with its coupling, both couplings being shown partially in cross-section.

Figure 5 is a cross-sectional view substantially taken along line 5—5 on Figure 4, and looking in the direction of the arrows.

Figure 6 is a cross-sectional view of the main clutch, taken substantially along line 6—6 on Figure 4, and looking in the direction of the arrows.

Figure 7 shows the eccentrics and is a cross-sectional view taken along the line 7—7 on Figure 4, looking in the direction of the arrows.

Figure 8 is a fragmentary view of the cutting and forming dies, taken from the side opposite to that shown in Figure 3, showing actuating lever and cam for operating actuating lever, jaws in open position.

Figure 9 shows a fragmentary view of the cutting and forming dies, cam and actuating lever, from the same side that is shown in Fig. 3; the cutting and forming dies being in closed position.

Figure 10 is a side view of the cutting and forming dies and partial cross-sectional view taken along the line 10—10 on Figure 9, looking in the direction of the arrows.

Figure 11 is a cross-sectional view taken along line 11—11 on Figure 9, looking in the direction of the arrows.

Figure 12 is a side view of the cutting and forming die member faces showing a ribbon being fed in between the open jaws, preparatory to cutting a blank therefrom to form a tag.

Figure 13 is a side view of the die faces showing the blank just after being cut.

Figure 14 is a side view of the die faces during the operation of forming the blank.

Figure 14A shows the blank just being cut.

Figure 14B shows the finished blank ready for receiving the identification marks.

Figure 15 shows cams and cam follower mechanism for opening the tag-holding fingers.

Figure 16 is a partial cross-sectional side view of mechanism for holding and operating carrier arms and fingers.

Figure 17 is a cross-sectional view of cam plate and cams for operating carrier arms, taken along line 17—17 on Figure 16, and looking in the direction of the arrows.

Figure 18 is a side view showing carrier arm operating mechanism.

Figure 19 shows same as Figure 17, but with cam plate in position so that engagement of cam for operating carrier arm is in engagement with the respective mechanisms.

Figure 20 shows the gripping fingers in open position.

Figure 20A shows the face of one gripping finger.

Figure 21 shows in a partial cross-sectional view the mechanism for embossing the identification marks on the tag and for setting identification figures on the embossing members.

Figure 21A is a face view of the finished tag.

Figure 22 is a partial cross-sectional view of the mechanism for setting the identification marks on the embossing members, looking in the direction of the arrow in Figure 21.

Figure 23 is a fragmentary front view of the mechanism to apply the tags.

Figure 24 is a fragmentary front view of the tag-applying mechanism, with tag in position ready for being applied.

Figure 25 is a side view of jaw mechanism for bending and closing a tag, jaw being in open position.

Figure 26 shows in side view the jaw mechanism for applying the tag, jaws being closed.

Figure 27 shows in side view the tag-applying mechanism, including cams for operating said mechanism. The jaws for bending the tag are in open position and withdrawn from the tag.

Figure 28 shows in side view the tag-applying mechanism with the jaws closed, including cams for operating said mechanism.

Figure 29 is a diagram of the electric wiring and main operating switches.

Figure 30 is an axial and rear view of the main operating shaft showing all the cams.

Figure 31 is a timing diagram showing the relative movements of the operating shafts and the timing of the individual operations.

Figure 1:
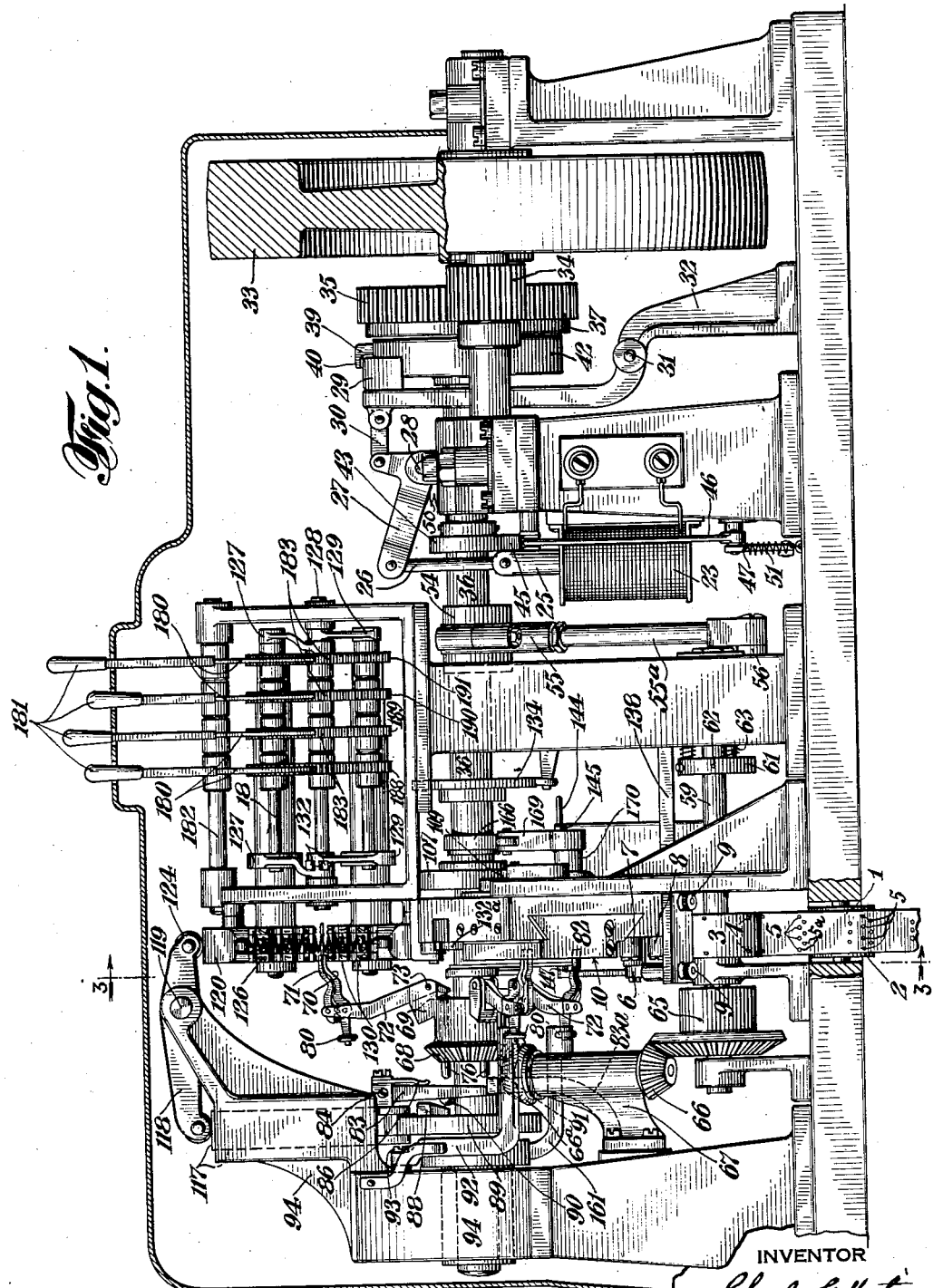
Figure 1 is a rear view of the machine with the casing broken away.
Figure 2:
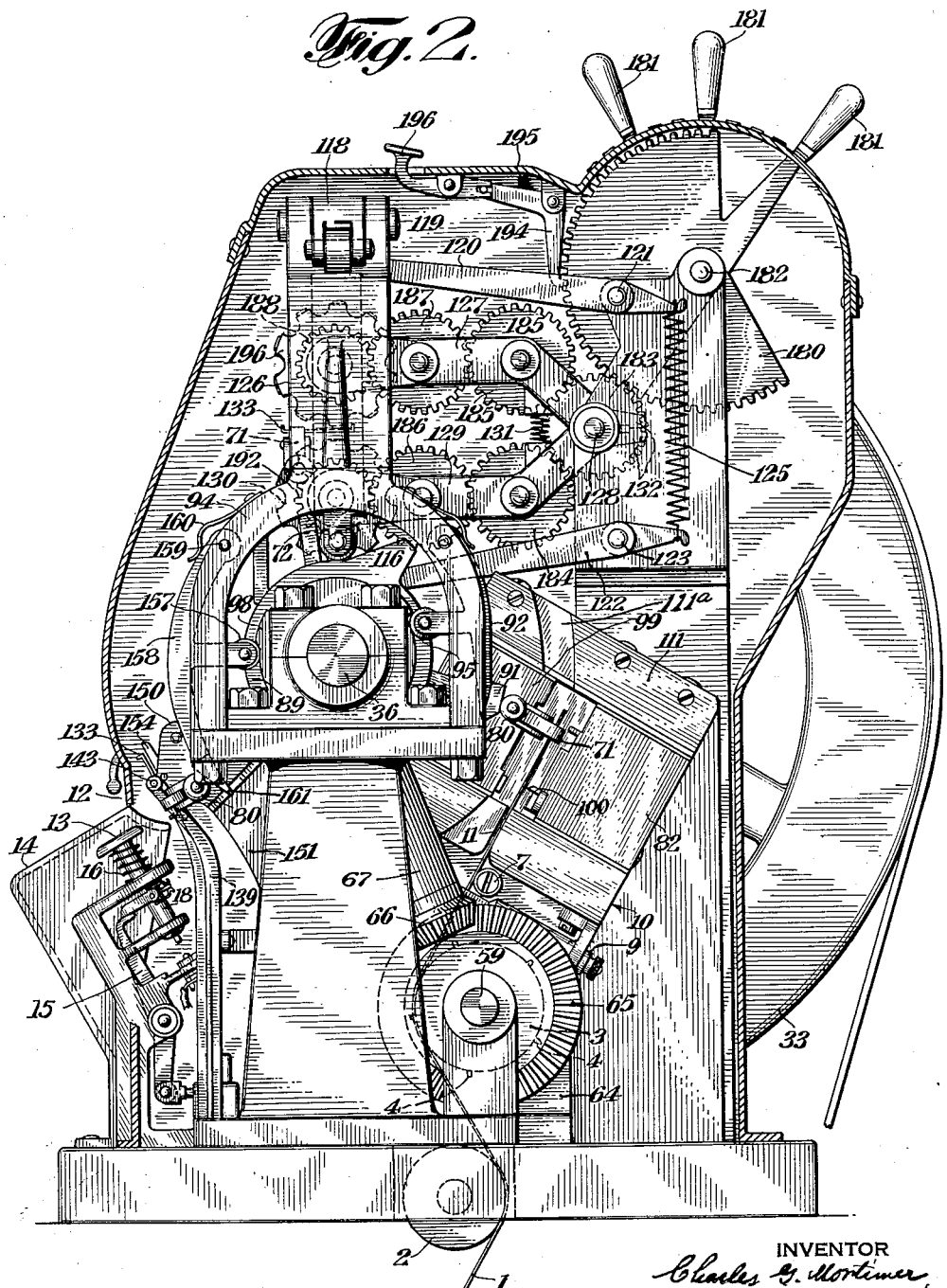
Figure 2 is an end view of the machine in the direction of the shafts, with the casing broken away, the front of the machine being at the left of the figure.
Figure 3:
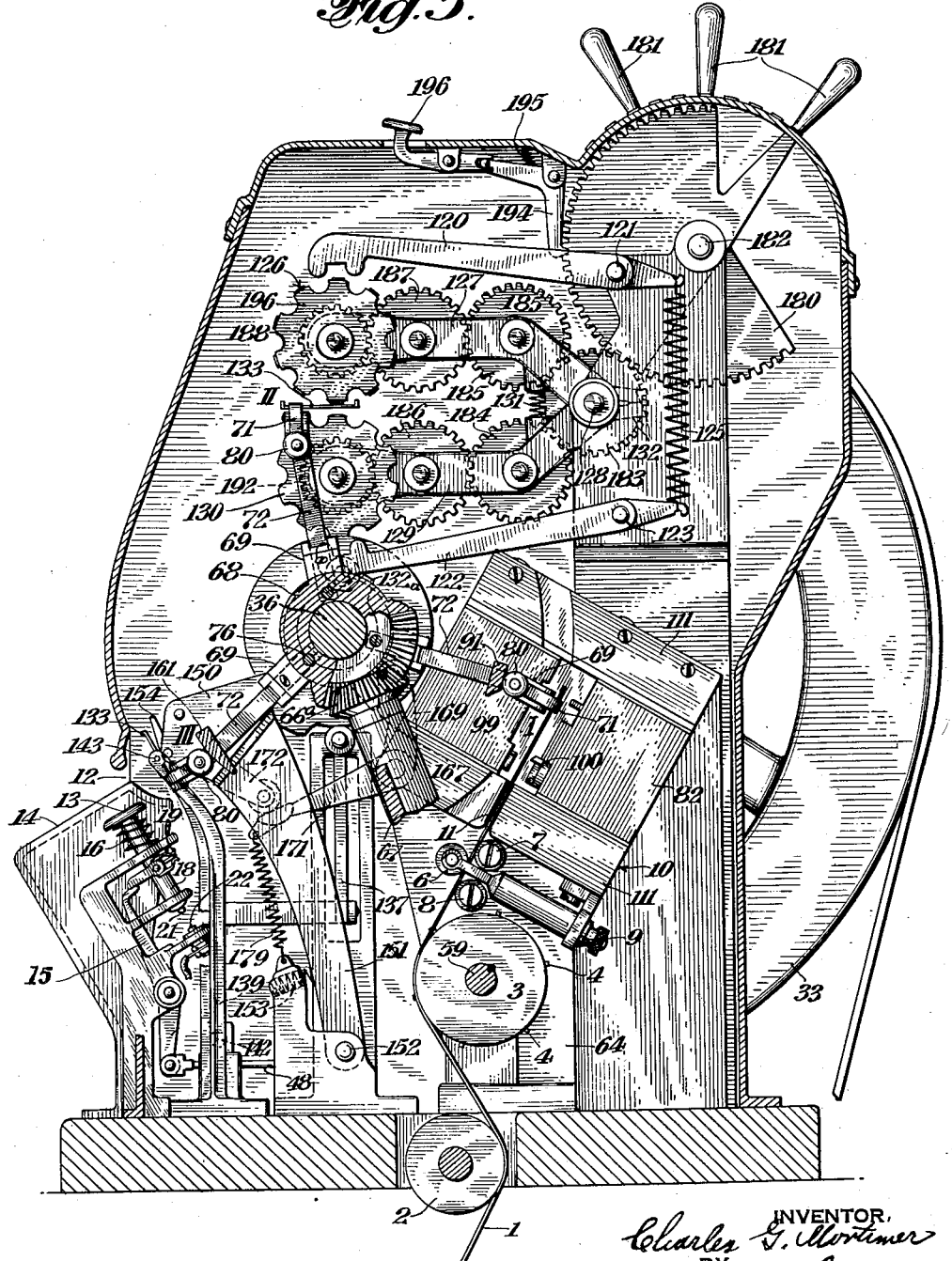
Figure 3 is a cross-sectional view of the machine substantially along line 3—3 on Figure 1, and looking in the direction of the arrows.

In Figures 1, 2, and 3, 1 is the metal ribbon from which the tags are made. The metal ribbon comes from a magazine roll of conventional design, not shown. This ribbon is provided with perforations distributed as per Figure 14A, the mechanical purpose of which will be apparent when the individual operations are described. Besides these mechanical reasons for providing such perforations, I provide these apertures to allow a free flow of water through the tags and through that part of the laundry pieces to which the tags are applied, and around which they are folded, as will be described later. This secures a thorough contact of the working liquid and the laundry pieces also in the neighborhood of and between the folds of the tag. The ribbon runs over an idler 2, which acts as a guide and secures the contact of the ribbon with the feed roll 3 over a long part of its circumference, and also secures engagement with more than one pair of the propelling pins 4 on the feed roller. These pins engage with the outer perforations 5 on the ribbon.

From this feed roller the ribbon is forced through straightening rolls 6, 7 and 8, more clearly shown on Figures 3, 8 and 9. Roll 6 can be adjusted with respect to its distance from the pair of rollers 7 and 8. This is done by adjustment screws 9. When a new ribbon is inserted, it is convenient to be in a position to increase this clearance.

After leaving the straightening rolls, the ribbon enters the die device 10 through slot 11 acting as a guide. This is as far as the ribbon goes when a new ribbon is inserted.

In order to convey the ribbon through the whole machine, the machine must be operated until the first finished tag appears at the slot 12, the front of the machine (Figures 2, 3, 27 and 28) or after five operations of the machine. The material to be identified is inserted into slot 12 and the identification tag applied, as will be described later.

The machine is started whenever the operator presses the push buttons 13, 13a. There is a pair of such buttons, one on either side of the platen 14. The piece of fabric, or whatever material must be provided with tags, is held on platen 14 and pushed into the slot 12 and it is apparent that the operator when holding the material can easily reach both buttons 13 and 13a. The operator automatically stretches the material over the platen 14 in order to reach the two buttons 13 and 13a located on the sides of the platen. This ensures that the tag is applied to an unwrinkled portion of the material, which, e. g. in the case of laundry, prevents wrinkles which would be ironed in later on.

Figure 29 is a diagram of the electric circuit into which buttons 13 and 13a are inserted. 200 is the source of electric power. The current flows from the + pole to the contact lever 15. As soon as button 13 is pressed against the resistance of spring 16, contact is made between the inturned point 49 of lever 15 and toe 17, pivoted on contact rod 18. Figure 29 shows this position. Toe 17 is normally held in a position perpendicular to the contact rod 18 by means of spring members 19 and tongue 20 which is an extension of the toe 17. Suitable insulation is provided to secure the flow of current in the above described way.

Further depression of the button 13 causes the toe 17 to be turned upwardly with respect to rod 18, as shown in dot and dash lines on Figure 29, and also causes contacting of the points 21 and 22. It must be noted that the toe 17 and the upper end of 15 remain in contact when 21 reaches 22. Flow of current is then established between 15 and the solenoid coil 23 up to terminal 24. By the simultaneous pressing of button 13a, the complete circuit is closed.

As soon as power is by this means supplied to 23, the solenoid core 25 is pulled into the coil and takes with it connecting rod 26 and bell crank 27 which is fulcrumed at 28 and linked to cam track 29 by means of link 30. Cam track 29 is pivoted at 31 to a stationary support 32. These parts are shown on Figures 1, 4, 5 and 6.

Referring also to Figure 3, the fly wheel 33 is driven by a belt or the like from a motor not shown. A pinion 34 is attached to 33 and engages with a tooth wheel 35 which is free on shaft 36. To the wheel 35 a collar 37 is attached. This collar is provided with a plurality of notches 38, shown on a large scale on Figure 6. These notches are adapted to receive the inner end of clutch dog 39. This dog is held up by means of the cam track 29 riding under the lip 40. It engages with one of the notches 38 as soon as 29 is removed from the holding lip 40 of dog 39 by the already-described mechanical operations following the energizing of solenoid 23; thereupon it drops into one of the notches 38 owing to pressure of the spring 41. It will be noted that a plurality of notches 38 are provided to reduce the intermission between the moment the push buttons 13 and 13a are depressed, and the moment the shaft 36 begins to revolve.

Clutch dog 39 slides in a radial slot in the clutch plate 42 which is pinned onto shaft 36 by means of pin 201. This pin is a safeguard against overloading other vital parts of the machine and will be of sufficiently soft material or small size to limit the power transmitted by 36.

As soon as clutch dog 39 engages with one of the notches 38, the shaft 36 will be turned one turn or until the dog lip 40 rides up on cam track 29. This cam track goes back into its original position as soon as shaft 36 and disc 42 have revolved enough to allow a return of 29 without interfering with 39. This is accomplished by a cam 43 on shaft 36, which engages with a cam follower 44, Figure 5. 44 operates via the bell crank 45, a link 46, another bell crank 47, and another link 48, the contact lever 15, shown also on Figure 29. Thus the engagement of the cam 43 causes a disengagement of contact lever point 49 and contact toe 17. The power applied to the solenoid 23 is interrupted no matter whether buttons 13 and 13a are still or not and the cam track 29 is brought back to its original position to engage under lip 40 by means of a spring 50. The engagement of cam follower 44 and cam 43 is secured by means of spring 51. The last-described operation may be designated as a clutch safety release. This definitely insures that shaft 36 is stopped again after having made one full turn, no matter whether the push buttons are depressed during this period or are left depressed by inadvertence. The push buttons must be released before operating the machine a second time. This will cause the operator to withdraw the piece onto which the tag was applied and will help to prevent two or more tags from being applied at the same point.

When contact lever 15 is operated from cam 43, a free snapping of toe 17 into the position 53, shown by dotted lines on Figure 29, is secured. Upon releasing button 13, the contact pin goes back and contact points 21 and 22 are disengaged. If 15 moves back because of further turning of cam 43 before the button 13 was released, the toe 17 would pass the point 49 upon releasing of 13 and go back to the uppermost position.

It is obvious from the above that shaft 36 cannot make one full revolution without the driven coupling member 42 being disconnected from the driving member 37. Onto shaft 36, an eccentric 54, more clearly shown on Figure 7, is keyed. This eccentric operates a strap 55 which operates through rod 55a the crank 56 of ratchet member 57. Upon the first half of the revolution of shaft 36, the teeth of the ratchet member 57 slide over the teeth of similar shape on the ratchet member 58. While the ratchet member 57 is free on the auxiliary shaft 59, the ratchet member 58 is keyed onto this shaft through pins 60, the disc 61, and key or pin 62. 58 is forced against 57 by means of spring members 63. On the second half of the turn of the shaft 36, the ratchet members 57 and 58 will be, due to the particular shape of the ratchet teeth, locked together, and the auxiliary shaft 59 will be revolved a fraction of a revolution. Auxiliary shaft 59 is supported by bearings 64 between which the feed roller 3 is keyed onto the auxiliary shaft. The eccentric is so dimensioned that this feed roller pushes the ribbon, from which the tags are cut, for the length of one tag.

At the end of shaft 59, a bevel gear 65 is keyed, which drives the intermediate bevel member 66, 66a, shown on Figures 1, 2 and 3. This member is supported by support 67 and drives the bevel gear 68. Bevel gear 68 runs loosely on shaft 36, by which it is supported. An axial movement of 68 may be prevented by suitable collars on the shaft, not shown. The bevel gear 68 carries three arms 69 which are equally spaced around its circumference.

It will be apparent from Figure 16 that these arms carry each a pair of gripping fingers 70 and 71. The gripping fingers are connected to the arm 69 by connecting lever arms 72 which are rotatable around pin 73. The lever arms 72 each carries a toe 74 which rests on a pin-head 75 of pins 76. A definite engagement of the toes with the pin-heads is secured by springs 77. A movement of the pins 76, on Figure 16, to the right causes a movement of the lever arms and the gripping fingers in the plane of the center-line of shaft 36. The gripping fingers 70 and 71 are adapted to hold one tag and transport it to the positions where the individual operations of making, identifying and applying the tag take place. These positions will be henceforth called "stations". Station I is the station where the tag is cut and shaped; at station II the identification marks are applied to the tag; at station III the tag is applied to the material to be identified.

The gripping fingers are shown in Figures 20 and 20A. Finger 70 carries pins 78 which are spaced apart so that they fit into the holes 5 and 5a of the ribbon, shown on Figure 14A. The gripping finger 71 has holes 78a corresponding to the pins 78 so that when the two fingers are in closed position, the tag is accurately secured in proper position. The fingers 70 and 71 are kept in closed position by the spring 79. Finger 70, however, has an extension which carries a contact roller 80. Whenever this contact roller rolls over a cam-like surface of suitable shape, the fingers are opened. The fingers are geared together, as shown, by teeth 81 so that both take part in this opening motion.

After the ribbon is fed into the machine, as previously described, straightened out, and put into the guide slot 11, the machine will be started by pressing the push buttons 13 and 13a. At each operation of the push buttons, the ribbon will proceed for the length of one tag further into the machine, and will at, for instance, the third operation, be sufficiently advanced so that a complete tag can be cut by the die members 82 and 99, shown in Figures 8 to 14.

During the operation of the last feed motion which takes place, as aforesaid, during the second and third quarter of the turn of the main shaft 36, the arm 72 approaching the die is held in a swung out position so as to keep clear of the die. This is accomplished by a stationary track 83a against which the pin 76 abuts. On passing beyond track 83a, the pin 76 releases the arm 72 to the action of spring 77, which throws the gripping fingers into the opening provided for them in the dies 82 and 99 just before or after the gripping fingers are opened preparatory to gripping the ribbon.

Just before the die members 82 and 99 are closed, the contact roll 80 runs up on a shoe 91, shown on Figure 15, which causes the fingers 70 and 71 to open. The shoe 91 is attached to the shoe holder 92 which is pivoted at 93 to the stationary support 94. The shoe holder 92 has an extension provided with a cam follower 95 which normally rides on cam plate 96 which holds cams 97 and 98. Cam plate 96 is keyed to shaft 36. The shoe 91 is forced outwardly with regard to the shaft 36 as long as 95 rides on 97, and by this outward movement, the fingers 70 and 71 are kept open until the cam plate 96 has revolved far enough to allow cam follower 95 to drop down from the cam 97. At this moment, the fingers are closed. The positions of the shoe 91 and cam 97 are so timed with respect to the operation of the die members 82 and 99, that this closing of the fingers and gripping of the ribbon takes place just before the die closes in order to cut and shape a tag.

Figures 8 to 14 show the die in detail. The die consists of two members 82 and 99 dove-tailed in a guide groove in die block 111. Figure 12 shows the die in full open position with the ribbon inserted ready to be cut and shaped. Figure 13 shows the cutting member 100 after severing the ribbon. The ribbon is cut along a serrated line, as shown on 14A. Figure 14 shows the die fully closed. At this point the tag is brought to the finished form, as shown on 14B. The outer serrated ends are turned down, and at the same time the reenforcements 101a, 102a and 103a are formed. Figure 11 shows the face of the die 99. The serrated part 104 is the cutting member on die 99 which cooperates with cutter 100 on punch 82. It also shows the grooves 101, 102, 103 necessary for making the reenforcements. Corresponding ridges are formed on the face of punch 82. The openings 105 on the die 99 and 106 on the punch 82 are to accommodaate the gripping fingers 70 and 71, which enter therein, as already described, when the jaws of the die are in the open position shown in Figure 12.

Figures 8, 9, and 10 show the operation of the die. On shaft 36 is keyed a cam plate 107 carrying cam 108. Upon turning the shaft 36, this cam moves cam follower 109 at the end of arm 115, which is mounted on disc member 110. This disc member 110 rotates freely in a recess of die-block 111 and is held within this recess by the ring member 112. The disc 110 is provided with two eccentric slots. The die member 82 carries pin 113 and the die member 99, the pin 114, each occupying one of said slots. It is obvious that upon revolving of shaft 36 in the direction indicated by the arrow, Figure 8, the connecting arm 115 is turned and the die members 82 and 99 will be drawn together. As soon as the cam follower 109 rides over the cam 108, the die members 82 and 99 will be pulled apart by means of spring member 116a, (which is fastened on one end to the die-block 111, and on the other end to the arm 115), and the die is ready again to receive the ribbon. The die block has a gate or channel 111a to permit the passage of gripping fingers and tag carried thereby.

The finishing of the tag within the die was the last action brought about during the first 90° of the turn of shaft 36. Upon completion of this 90° turn, the previously mentioned ratchet coupling 58 and 57 is engaged and further ribbon is brought into the machine by the revolution of feed roller 3. While the shaft 36 continues to revolve for 180°, the transport arms 72 with gripping fingers 70 and 71 are moved 120°. By this movement the tag which has been just finished in the die is carried to the station II where the identification marks will be embossed on it. The timing itself of the individual operations will be better understood from the diagrams on Figure 31 which will be described later.

During the whole of the embossing operation, the tag is securely held by the gripping fingers 70 and 71. The embossing action will be best understood from Figure 21, and also Figures 1, 2 and 3. In Figure 21, the cam plate 89 is shown keyed onto shaft 36, near the far left end of said shaft, as shown on Figure 1. On plate 89, a cam 116 is provided which cooperates with the slide member 117 of preferably square cross-section. This slide member slides in the stationary support 94, which was previously mentioned in connection with the shoe holder 92. The slide member 117 abuts against the lever 118 which is pivoted at 119. The slide member 117 is shown on Figure 21 in its uppermost position, and in Figure 1 in its lowermost position. The far end of the lever 118 abuts against the presser arm 120 which is pivoted at 121. This presser member is like the pressing member 122 which is pivoted at 123. Both members have extensions to which a spring member 125 is hooked and which keeps the presser arms in open position and secures abutment of 120 and the roller 124 on the far end of lever 118. The pressing member 120 engages with the upper embossing member 126, and the pressing member 122 with the lower embossing member 130. The embossing members 126 and 130 are of cylindrical shape and are each built up of a plurality of disc-like parts. These parts have accurately spaced radial recesses which match with a plurality of extension fingers on the pressing arms 120 and 122. The cooperation of these fingers on the pressing arms and the recesses secures an absolutely accurate alignment of the positive and negative embossing members 126 and 130. The embossing members 126 are held in position by means of suitable gears, the purpose of which will be described later, and which are mounted on a bent arm 127 which is pivoted at 128. At 128 another arm 129 which is like the arm 127, is also pivoted which carries on its far end embossing member 130. The arms 127 and 129 are held apart by a spring 131 which is shown on Figures 2, 3 and 21. The distance at which they are held apart is limited by the stops 132 forming extension of the arms 127 and 129 beyond their pivot 128.

At the same time that the presser 120 is depressed by means of the cam 116, the sliding member 117 and the lever 118, a cam 132a which is also keyed to the shaft 36, pushes the lower pressing arm 122 upward. Both cams 116 and 132a operate at the same instant and the identification mark is embossed on the tag 133. We have now completed the second operation, the embossing of the tag. This was accomplished at the first quarter turn of shaft 36. The second and third quarter of this turn will push more ribbon into the machine to supply the material for the next tag, and will at the same time carry the now embossed tag to station III, at which it is applied to the work piece to be identified. It must be noted that at the same time, when this tag was embossed, another tag was shaped and cut in the die at station I, and will be transported now by means of the carrier arm 72 to the embossing station (II).

As soon as push buttons 13 and 13a are pressed the next time, the tag which has just received the identification marks at station II will be applied to the material to be identified. This operation which takes place at station III will be understood from Figures 2, 3, 15, and 23 to 29.

On the main shaft 36, is a cam plate 134 with a cam projection 135 abutting against a cam follower 136. This cam follower operates, by way of a bell crank 137, and a connecting member 138, an arm 139 which is pivoted at 140. Abutment of 135 and 136 is secured by the spring 141 and the piston member 142. The arm 139 operates on its far end a rod or pin member 143 which is of very small diameter on one side of arm 139 and heavier on the other side (144). The rod 143, 144 slides in the bearing members 145 and 146. It is pushed sideways parallel to the center-line of the main shaft 36, by the arm 139 by means of a fork-line extension on the arm and a cross-pin on the rod or the like, due to the action of spring 141. Upon engagement of cam follower 136 and cam 135, the pin 143 is moved towards the left on Figure 23 or removed from the bearing 147. At its furthermost position to the right, shown on Figure 24, the pin 143 is inserted into the bearing member 147, and securely held between 146 and 147. On shaft 36 is a pair of cams 148. These cams cooperate with the cam followers 149, supported by brackets 150 which are mounted on arm 151. This is supported and pivoted at 152. Engagement of 149 and 148 is secured by a spring 153. The bracket 150 holds on the end opposite to the follower roll 149, the closing jaws 154 and 155. As soon as the pin 143 is in the position between bearings 146 and 147, the cam 148 moves the bracket 150 and the closing jaws 154 and 155 which are pivoted at 156 until they are close to the pin 143. The gripping fingers 70 and 71 hold the embossed tag, so that the pin 143 abuts against the tag 133, near its central line, as shown on Figure 27. The fulcrum pin 156 of the jaws 154 and 155 will be moved so far towards the pin 143 that the tag is securely held by the pressure of the pin 156 against it. It will be noted that the cam surface 148 is concentric with 36 for a sufficient length to hold the tag against the pin so that another operation, namely the opening of the gripping fingers 70, 71 and the removal of these fingers, can be carried out.

How the fingers 70 and 71 are opened at this station III is obvious from Fgure 15. The cam 98 on the cam plate 96 is correctly timed with the cam 148 to accomplish this opening in the period mentioned in the previous paragraph. The cam 98 abuts against the cam follower 157 which is mounted on the shoe holder 158. This shoe holder 158 is pivoted at 159 to the stationary part 94. The shoe holder is forced against the cam by means of spring member 160. At the last transport operation of the carrier arms 72, which took place during the second and third quarter of the turn of the main shaft 36 during the last operation of the machine, the carrier arms stopped adjacent to the shoe 161 on shoe holder 158. If this shoe is now moved outwardly with respect to 36 due to the riding up of the cam follower on the cam 98, the gripping fingers will open as previously described. This happens at the last quarter turn of shaft 36. We now have to remove the gripping fingers so as to make clearance for the action of the jaws 154 and 155. This is done by the arm 83, shown on Figures 16 and 17.

Arm 83 is pivoted at 84 to a stationary support 85, and is held by a spring member 86 against a stop 87. There is a cam 88 attached to the cam plate 89 which is keyed to shaft 36. The lever arm 83 carries a projection 90 which contacts with cam 88 to thrust pin 76 against the end of carrier arm 72, and remove the fingers from position of interference with jaws 154, 155.

The shaft 36 is stopped after one turn by means of the clutch members 37 and 42 and the interlocking device 39, 41 and 29 previously described. It is apparent that at the time of the stop the arm 72 is still swung out and 83 and 90 are in engagement with cam 88.

When the machine is started again by depressing the push buttons 13 and 13a, the projection 90 keeps on riding on cam 88 until shaft 36 has completed little more than its first quarter turn. After completion of the first quarter turn the spider member formed by bevel gear 68 and arms 69 is revolved by means of ratchet clutch 57, 58, shaft 59, and bevel gears 65, 66 and 68. The pin 76, which was until this point riding on stationary lever member 83, leaves 83 and is taken over by stationary track 83a. It keeps on riding on this track during its travel towards the die station I. What happens on this station has been previously explained.

As soon as arm 72 is removed the jaws 154 and 155 can be closed.

This is done as follows:—

Figures 23, 24, 25 and 27 show the jaws in open position. Figures 26 and 28 show the jaws closed. Shaft 36 carries a cam plate 166 having a cam 167. Cam follower 168 is supported by crank member 169 which is pivoted at 170 and has another crank arm 171. Crank arm 171 abuts on closing lever 172 which is keyed to pin 173. A toothed segment 174 is keyed to pin 173. This segment meshes with another segment 175 which is rotatably supported by plates 150. Each jaw member 154 and 155 is provided with a toothed extension, one of which meshes with segment 174, the other with 175. A spring 176 between plate 150 member 150 and segment 175 holds the jaws in open position. Whenever cam follower 168 rides up on cam 167 the jaws are closed and the tag 177 is closed around the pin 143. A piece of material which is held into slot 12, Figures 2 and 3, is then firmly gripped by the tag and particularly by the upset serrated edges 178, shown in Figure 14B. It will be noted that the pin 143 is sufficiently away from the center-line of the tag that the edges close one outside of the other, which secures only a bending of the material, and prevents the cutting of it while at the same time exerting a firm grip on the material. This is more apparent from Figure 26. Engagement of cam 167 and cam follower 168 is secured by spring member 179.

While jaws 154 and 155 are closed the pin 143 is withdrawn as previously described by proper timing of cams 167 and 135.

Figures 1, 2, 3, 21 and 22 show the way of setting of the embossing members to apply the desired identification. The toothed segments 180 terminate in handles 181. The segments are rotatable on shaft 182. Their toothed peripheries mesh with toothed idlers 183 which are revolvable on shaft 128. These idlers 183 mesh with idlers 184 and 185 of each of which there are a number equal to the numbers of the idlers 183. Idlers 184 and 185 mesh with another set of idlers 186 and 187; each set again contains as many idlers as there are idlers 183. The idlers 187 are geared to pinions 188, 189, 190, 191. Idlers 186 drive another set of pinions 192. Pinion 188 is connected by sleeve 188a to embossing punch member 193, which is one of the punch members shown in Figure 21 and referred to collectively as 126. Pinions 189 to 191 are in turn connected to embossing punch members 194 to 196 by way of concentric sleeves, all carried by the punch member supporting shaft. By like connections, the motion of idlers 186 is transferred to the pinions 192 of die members 130. To set the punch and die members simultaneously for obtaining the desired identification mark the handles 181 must be operated. It is obvious that a construction such as described secures that there shall be always the correct male embossing part 126 cooperating with the corresponding female part 130. When the desired identification marks are thus set, the toothed segments 180 are locked by means of locking member 194, which is maintained in the locked position by means of spring 195. To unlock one segment the respective button 196 must be depressed.

Figure 31 will serve to better exhibit the timing of the individual movements and operations.

Line 165 indicates position of shaft 36 at the moment of the start of its revolution. Within the first quarter turn of shaft 36 the following operations take place:

1. Closing and opening of die jaws 82 and 99 (station I):

Within a fraction of the first quarter turn but beginning with the turning of the shaft:

2. Closing and opening of embossing members 120 and 122 (station II).

3. Closing and opening of applying jaws (station III).

4. Breaking of electric circuit which energized solenoid coil 23 and repositioning of cam track 29 for limiting operation of shaft 36 to one turn (clutch safety release).

5. Needle 143 is removed after applying jaws 154 and 155 have been closed.

At the second and third quarter turns of shaft 36 the shaft 59 is revolved for 60° and spider arms 69 for approximately 120°. Shaft 59 takes care of feeding more ribbon into the machine, sufficient for making one tag.

Spider arms 69 carry the transporting arms 72, which carry one tag, which is cut and formed at station I, from station I to station II, and at the same time one now identified tag from station II to station III.

At the end of the third quarter turn of shaft 36 the fingers of the transport arm approaching station I are opened.

During the last quarter turn of shaft 36 the hinge 156 of the applying jaws 154 and 155 moves towards the needle 143 and holds a new tag which was brought from station II during the third quarter turn. The fingers which held the tag on its way from II to III are opened and the arm 72 holding these fingers is withdrawn.

I claim:—

1. A machine of the character described, comprising means for making identification tags from a ribbon-like material, means for applying identification marks to said tags, means for applying said tags to the materials to be identified, the said three operations being carried out simultaneously on three tags, and means for transferring a tag successively from the tag-making means to the tag-marking means and from the tag-marking means to the tag-applying means.

2. A machine of the character described, comprising means for making identification tags from a ribbon-like material, means for applying identification marks to said tags comprising adjustable character impressing members, means for applying said tags to the materials to be identified, manually controlled means for adjusting said members to vary the character impressed, means for locking the adjusting means in any position of adjustment, and manually controlled means for unlocking the same.

3. A machine for identifying materials, comprising means for making identification tags, means for applying identification marks to said tags, means for applying said tags to the materials to be identified, and a common power supply, said three means being connected to the common power supply to successively operate upon a single tag and simultaneously operate upon three successive tags.

4. In a machine for identifying materials of soft and sheet-like character, means for making identification tags by severing them from a ribbon, and applying said tags to the materials to be identified, comprising means for bending the tag at both ends at right angles to the plane of the tag on lines parallel and adjacent to the lines of severance of the tag, and means for bending the tag body in U-form on a line intermediate its ends, around the edge of the material.

5. A machine for making identification tags from a ribbon-like material having perforations, comprising means for applying identification marks to said tags and means for applying said tags to the materials to be identified, said machine comprising a feed mechanism provided with gripping pins for feeding the ribbon-like material to the machine, and carriers provided with gripping fingers for carrying the tag through the machine, said fingers being also provided with gripping pins adapted for cooperation with apertures in said ribbon-like material.

6. In a machine for making and applying identification tags, the combination of a feed mechanism for supplying the machine with materials from which the tags are made, a die mechanism for shaping and cutting the tags and an embossing mechanism for embossing identification figures on the tags, a power driven cam shaft, said shaft operating simultaneously said die and said embossing mechanism, and an eccentric and ratchet coupling mechanism, said eccentric and ratchet coupling mechanism being also driven by said power driven cam shaft and operating said feed mechanism alternately with said die and embossing mechanism.

7. In a machine for making and applying identification tags, the combination of a feed mechanism for supplying the machine with materials from which the tags are made, a die mechanism for severing the tags, an embossing mechanism for embossing identification figures on the tags, a jaw mechanism for folding and applying said tags to the material to be identified, means for seizing the tag severed by the die mechanism and carrying it successively to the embossing mechanism and the folding and applying mechanism, and a power driven cam shaft, said shaft operating said die, said embossing and said jaw mechanism.

8. In a machine for making and applying identification tags, the combination of a feed mechanism for supplying the machine with materials from which the tags are made, a die mechanism for shaping and cutting the tags, an embossing mechanism for embossing identification figures on the tags, a jaw mechanism for folding and applying said tags to the material to be identified, and a carrier mechanism for carrying the tags from the die mechanism to the embossing mechanism and thence to the folding an applying mechanism.

9. In a machine for making and applying identification tags, the combination of a feed mechanism for supplying the machine with materials from which the tags are made, a die mechanism for shaping and cutting the tags, an embossing mechanism for embossing identification figures on the tags, a jaw mechanism for folding and applying said tags to the material to be identified, and a carrier mechanism for carrying the tags from the die mechanism to the embossing mechanism and thence to the jaw or applying mechanism, a power driven cam shaft, said shaft operating said die, said embossing and said jaw mechanism, an eccentric and ratchet coupling mechanism, said eccentric and ratchet coupling mechanism being also driven by said power driven cam shaft and operating said feed mechanism and said carrier mechanism.

10. In a machine for making and applying identification tags, the combination of a feed mechanism for supplying the machine with materials from which the tags are made, a die mechanism for shaping and cutting the tags, an embossing mechanism for embossing identification figures on the tags, a jaw mechanism for folding and applying said tags to the material to be identified, a carrier mechanism for carrying the tags from the die mechanism to the embossing mechanism and thence to the jaw or applying mechanism, a power driven cam shaft, said shaft operating said die, said embossing and said jaw mechanism, an eccentric and ratchet coupling mechanism, said eccentric and ratchet coupling mechanism being also driven by said power driven cam shaft and operating said feed mechanism, and a bevel gear drive connected to said eccentric and ratchet coupling mechanism, said bevel gear drive operating said carrier mechanism.

11. In a machine for making and applying identification tags, the combination of a feed mechanism for supplying the machine with materials from which the tags are made, a die mechanism for shaping and cutting the tags, an embossing mechanism for embossing identification figures on the tags, a jaw mechanism for folding and applying said tags to the material to be identified, and a carrier mechanism for carrying the tags from the die mechanism to the embossing mechanism and thence to the jaw or applying mechanism, a power driven cam shaft, said shaft operating said die, said embossing and said jaw mechanism, an eccentric and ratchet coupling mechanism, said eccentric and ratchet coupling mechanism being also driven by said power driven cam shaft and operating said feed mechanism, and a bevel gear drive connnected to said eccentric and ratchet coupling mechanism, said bevel gear drive operating said carrier mechanism, said carrier mechanism being rotatably supported on said power driven cam shaft.

12. In a machine of the character described, the combination of means for feeding a ribbon of tag-forming material by successive steps a distance equal to the width of one tag, means for cutting off and forming a tag, means for seizing a tag and carrying it to position to receive identifying marking and then to tag applying position, means for applying identifying marks to the tag, and means for applying the tag to the goods to be identified.

13. In a machine of the character described, the combination of means for carrying a tag to tag-affixing position, means for affixing a tag to material to be identified, a material support at the tag-affixing position, and cooperating manually controlled means for starting the machine, partly on one side and partly on the other of the material support.

14. In a machine of the character described, the combination of means for affixing a tag to material to be identified, a material support adjacent to the tag-affixing means, means for operating the tag-affixing means, means for starting the operation of said operating means, including an electric circuit, and manually controlled means, located in said circuit, one on each side of the material support, cooperating to close said circuit.

15. In a machine of the character described, the combination of die mechanism for forming a tag, a tag-gripping mechanism, means for causing said gripping mechanism to engage and grip the tag in the die mechanism, tag-embossing mechanism, tag-affixing mechanism, means for moving the gripping mechanism from the die mechanism to the embossing mechanism and hold it there while being embossed and for moving it therefrom to the affixing mechanism, and means for opening the gripping mechanism at the tag-affixing position.

16. In mechanism of the character described, the combination of an operating shaft, tag-forming, embossing and affixing mechanisms arranged about said shaft, tag-carrying means mounted coaxially with said shaft and means for moving the tag-carrying means consecutively from the forming to the embossing, from the embossing to the applying, and from the applying to the forming mechanism.

17. In mechanism of the character described, the combination of tag-forming, embossing and affixing mechanisms, tag-carrying means, and means for moving the tag-carrying means consecutively to the forming, the embossing, and the affixing mechanism and back to the forming mechanism.

18. In mechanism of the character described, the combination of tag-forming, embossing and affixing mechanisms equally spaced about a common axis, a plurality of tag-carrying means equal in number to said mechanisms and equally spaced about said axis and means for rotating said several tag-carrying means as a unit about said axis and presenting each of the tags carried thereby to the said several mechanisms consecutively.

19. In mechanism of the character described, the combination of gripping fingers for engaging both sides of a tag, means for opening and closing said fingers, means for forming, embossing and affixing a tag, and means for moving the gripping fingers consecutively to the forming, embossing and affixing mechanism.

20. In a machine of the character described for use with a tag perforated to receive gripping members, gripping fingers having pins to engage the perforations in said tag, means for closing and opening said gripping fingers and means for moving the gripping fingers and tag carried thereby.

21. In a machine of the character described, the combination of die mechanism for forming a tag, said die mechanism have openings to receive tag-gripping mechanism, tag-gripping mechanism adapted to enter said openings and engage a tag in said die mechanism, means for closing said gripping fingers while in said die mechanism, and means for moving the gripping fingers from the die mechanism.

22. In a machine of the character described, the combination of die mechanism for forming a tag, comprising reciprocating cutting members and stationary guides therefor, one of said guides having a gate intermediate its ends to permit passage of a formed tag, and tag-carrying mechanism having means for gripping said tag while between the cutting members and means for moving said carrying mechanism to remove the tag from the die mechanism through said gate.

23. In a machine of the character described, the combination of means for forming a tag, means for embossing it, and means for affixing it, and means for carrying the tag successively to these three mechanisms, comprising a rotating member, a plurality of arms pivoted to said rotating member, tag-gripping members mounted on said arms, and means controlled by the rotation of said rotating member for moving said arms in planes axial to the rotating member and for opening and closing the grapping members.

24. In a machine of the character described, the combination with mechanism for forming a tag, mechanism for embossing it, and mechanism for affixing it, of carrier mechanism for the tag comprising a pair of gripping fingers, an arm carrying the gripping fingers, a rotary member to which said arm is pivoted, means for rotating the rotary member, and means controlled by such rotation for moving said arms in a plane including the axis of rotation, and for opening and closing said gripping fingers.

25. In a machine of the character described, the combination of tag-forming mechanism, tag-embossing mechanism, mechanism for seizing the tag at the tag-forming mechanism, removing it from the tag-forming mechanism, carrying it to the tag-embossing mechanism and holding it while the tag is being embossed.

26. In a machine of the character described, the combination of tag-holding mechanism, and tag-embossing mechanism, the tag-embossing mechanism comprising rotatory adjustable tag-embossing punch and die mechanism, means for adjusting the punches and dies to different positions to bring different portions thereof into engagement with the tag, means for holding the punches and dies from rotation during the embossing operation, and means acting upon the punch and die mechanism through the holding means therefor to cause the embossing operation.

27. In mechanism of the character described, tag-affixing mechanism comprising means for holding a tag and carrying it to tag-affixing position, a pin against which said tag is brought into contact intermediate its width by said holding and carrying mechanism, means for moving said pin into and out of the path of the tag, affixing jaws for bending the tag about said pin, and means for operating said jaws.

28. In mechanism of the character described, tag-affixing mechanism, comprising means for holding a tag and carrying it to tag-affixing position, a pin against which said tag is brought into contact intermediate its width but nearer one side than the other of the tag, by said tag-holding and carrying mechanism, affixing jaws for bending the tag about said pin, and means for operating said jaws.

29. In a machine of the character described, tag-affixing mechanism comprising a pin, tag-affixing jaws for bending a tag over said pin, adjustable in a path normal to the axis of the pin, a tag-holding and carrying member movable to carry the tag into contact with said pin, means for supporting said jaws movable to bring them into contact with the tag on said pin, means for operating said jaws to bend the tag over said pin, and means operated when the jaws are in contact with said tag to release the carrying mechanism from the tag and move it out of the path of the bending jaws.

30. In a machine of the character described, tag-affixing mechanism, comprising tag-bending jaws, an axially adjustable pin, means for carrying a tag into contact with said pin, holding means supporting said pin on both sides of the tag and means for adjusting the pin axially into and out of the path of the tag.

31. In a machine for identifying materials of a soft and sheet-like character, means for making and applying identification tags, comprising a serrated cutter for severing a tag from a metal ribbon, means for bending the severed tag at right angles to the body thereof at both ends adjacent to the serrated edges, and means for folding the body of the tag in U-form about the edge of the material to be identified, with the serrated ends parallel and engaging the material on opposite sides thereof.

32. In a machine for identifying materials of soft and sheet-like character, means for making identification tags by severing them from a ribbon, comprising die mechanism having a cutter for severing a tag from the ribbon and means for forming reenforcing ribs on the tag at right angles to the line of severance, and means for bending the severed tag at right angles to the body thereof at both ends adjacent and parallel to the severed edges, means for conveying the tag to tag applying position and means for folding the body of the tag in U-form about the edge of the material to be identified with the bent over ends parallel and engaging the material on opposite sides thereof.

33. In a machine for making identification tags from a ribbon-like material having perforations and applying them to material to be identified, the combination of ribbon feeding mechanism, means for severing a tag from the ribbon, means for impressing identification marks upon the tag, means for applying tags to material, and means cooperating with the perforations in the tags to seize the severed tags and carry them successively to the tag-impressing and tag-applying means.

34. In a machine for making identification tags from a ribbon-like material having perforations and applying them to material to be identified, the combination of ribbon-feeding mechanism comprising a feed roller having pins to engage the perforations in the ribbon and a guide roller for the ribbon located with reference to the feed roller to bend the ribbon over the latter, means for severing a tag from the ribbon, means for impressing identification marks upon the tag, means for applying tags to material, and means cooperating with the perforations in the tags to seize the severed tags and carry them successively to the tag-impressing and tag-applying means.

35. In a machine of the character described, means for forming a tag from a ribbon of perforated bendable metal and applying the same to a piece of material to be identified, comprising means for severing a tag from such ribbon on a serrated line, means for bending the ends of the tag to present lips extending parallel to each other on the same side of the tag, means for embossing the tag with identifying marks, and means for bending the tag in U-form on a line nearer one end than the other of the tag, so that the inturned ends lie parallel and one within the other.

36. In a machine of the character described, the combination of tag-severing mechanism, tag-embossing mechanism, tag-applying mechanism, means for feeding a ribbon of tag material to the tag-severing mechanism, means for carrying an individual tag from the tag-severing mechanism to the embossing and applying mechanisms consecutively, and means for simultaneously operating the severing, embossing and applying mechanisms in alternation with the operation of the feeding and carrying means.

37. In a machine of the character described, the combination of tag-severing mechanism, tag-embossing mechanism, tag-applying mechanism, means for feeding a ribbon of tag material to the tag-severing mechanism, means for carrying an individual tag from the tag-severing mechanism to the embossing and applying mechanisms consecutively, said carrying means comprising relatively movable tag-gripping members, and means for simultaneously operating the severing, embossing and applying mechanisms in alternation with the operation of the feeding and carrying means.

38. In a machine of the character described, the combination of tag-severing mechanism, tag-embossing mechanism, tag-applying mechanism, means for feeding a ribbon of tag material to the tag-severing mechanism, means for carrying an individual tag from the tag-severing mechanism to the embossing and applying mechanisms consecutively, said carrying means comprising relatively movable tag-gripping members having means for closing them on the tag when at the severing mechanism and for opening them to release the tag when at the tag-applying mechanism, and means for simultaneously operating the severing, embossing and applying mechanisms in alternation with the operation of the feeding and carrying means.

39. In a machine of the character described, the combination of tag-gripping members, a rotating sleeve whereon said members are pivoted so as to be movable in planes radial to the axis of rotation of the sleeve, pins mounted in the sleeve, axially movable parallel to its axis, and operatively connected to said tag-gripping members, and means operating by the rotation of the sleeve to axially move said pins to effect the rotation of the gripping members about their axes.

CHARLES G. MORTIMER.